Jan. 15, 1924.  
G. H. SHANE  
1,480,960  
WHEELED RIDING HARROW  
Filed Aug. 27, 1921

Inventor  
GEORGE H. SHANE  
By  
Attorney

Patented Jan. 15, 1924.

1,480,960

UNITED STATES PATENT OFFICE.

GEORGE H. SHANE, OF DENVER, COLORADO, ASSIGNOR OF ONE-HALF TO LOT P. BREEN, OF DENVER, COLORADO.

WHEELED RIDING HARROW.

Application filed August 27, 1921. Serial No. 495,879.

*To all whom it may concern:*

Be it known that I, GEORGE H. SHANE, a citizen of the United States, residing at the city and county of Denver and State of Colorado, have invented certain new and useful Improvements in Wheeled Riding Harrows; and I do declare the following to be a full, clear, and exact description of the invention, such as will enable others skilled in the art to which it appertains to make and use the same, reference being had to the accompanying drawings, and to the characters of reference marked thereon, which form a part of this specification.
This invention relates to agricultural machinery and has special reference to a harrow that is mounted on wheels and provided with means for raising and lowering the harrow sections.
Nearly every form of agricultural machine is provided with means which permit the operator to occupy a seat on the machine while he directs the horses and operates the machine. Harrows have not, as a general thing, been provided with means permitting the driver to ride although various carts have been made which are attached to the harrow and trail behind the same, the driver occupying a seat on the cart. Such carts are unsatisfactory for various reasons. They are very unsteady and hard to ride on and then they expose the driver to the dust which is invariably raised by the harrow when the soil is dry.
It is the object of my present invention to provide a harrow that is connected to a two wheeled cart in such a way that the sections of the harrow can be raised from the ground when it is desired to transport the same from place to place and in which the cart will afford a better and steadier vehicle for the driver than the cart's referred to above. The driver's seat being arranged directly over the harrow instead of behind it, he is not exposed to the dust in the same degree as in other devices.

It is also an object of my invention to so design my harrow that I can use two, three or four sections of harrow. When I desire to cultivate corn, for example, I can use three sections so arranged that I can finish two rows completely and the half of two other rows on each trip, thus virtually cultivating three rows on each trip.

In order to more clearly describe my invention, I shall have reference to the accompanying drawings in which:

Fig. 4 shows a rear elevation of the same equipped with three sections, and

The same reference numerals represent the same parts in all the several views.

Figure 1:
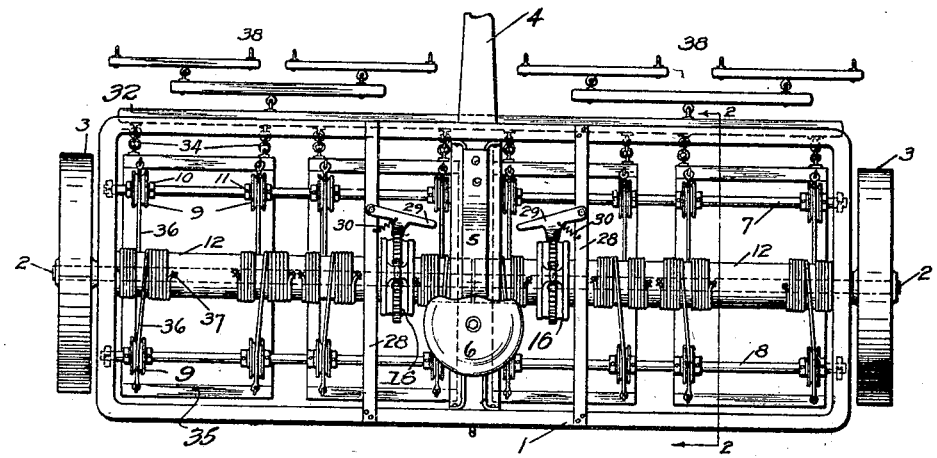
Fig. 1 shows a plan view of my harrow.
Figure 2:
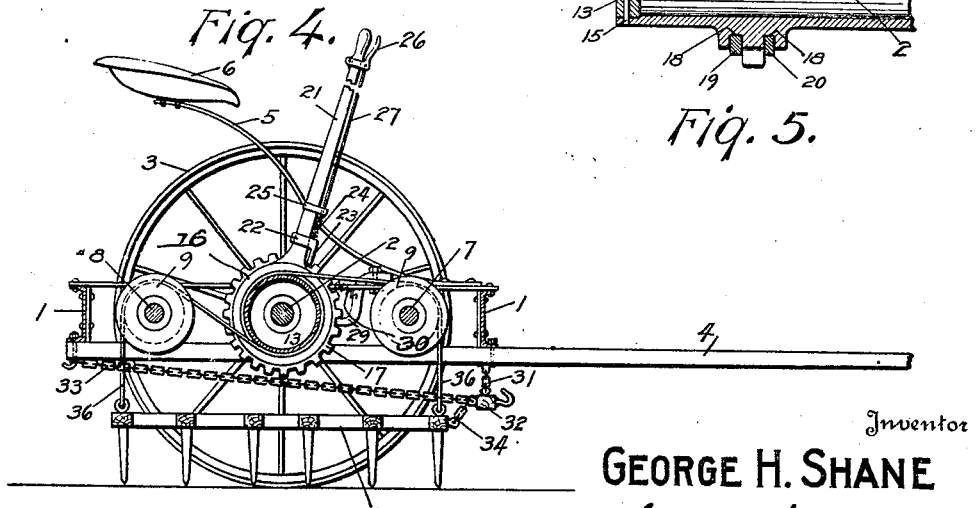
Fig. 2 shows a transverse section thereof taken on line 2—2 Fig. 1.

My improved harrow comprises a frame 1 of angle or channel iron through which extends a shaft 2 on the ends of which wheels 3 are mounted. A tongue 4 is rigidly secured to said frame as indicated in Figs. 1 and 2. Secured to the upper side of said frame is a spring 5 which supports a seat 6. Two shafts 7 and 8 extend longitudinally through frame 1 parallel with shaft 2, and have rotatably mounted thereon a number of pulleys 9 which are held in spaced relation by means of collars 10 held in place by set screws 11. Surrounding the central shaft 2 are two cylindrical members 12, the ends of which are provided with transverse members 13 having bearings 14 for the reception of shaft 2, said members 13 being held in place by means of screws or tap bolts 15. Near the central end of each cylindrical member 12 is an annular member 16, which may be integral with cylinder 12 or a separate part secured thereto by suitable means. Member 16 is provided with a notched wheel portion 17 and two annular grooves 18 for the reception of securing rings 19 and 20 of lever 21. Lever 21, which rotates in grooves 18, is provided with a member 22 having a projection 23 which engages with the teeth in wheel 17. A spring 24 extends between member 22 and an abutment 25 and tends to hold the projection 23 in engagement with the teeth on wheel 17. Lever 21 is also provided with a hand grip 26 which is connected to member 22 by means of a rod 27. Pivoted to transverse members 28 are kick-out pawls 29, which are held in engagement with the teeth on wheel 17 by means of springs 30. These pawls have their free ends extended beyond the portion that engages the ratchet teeth and these extensions serve as handles to be engaged by the foot for moving the pawls out of operative position.

Figure 3:
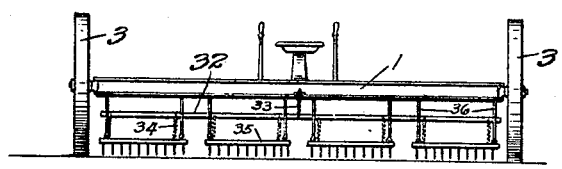
Fig. 3 shows a rear elevation of my harrow equipped with four (4) sections.
Figure 5:
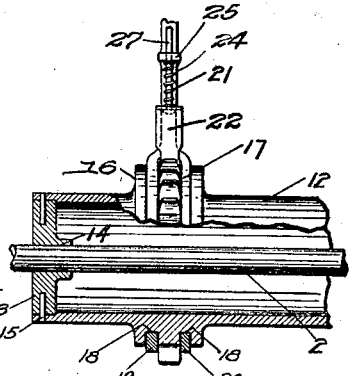
Fig. 5 is a detail of the rotatable hoisting cylinder.

Supported from frame 1 by means of short pieces of chain or other suitable means 31, is a bar 32, the middle point of which is connected to the rear of frame 1 by means of chain 33. Connected to bar 32 by means of chains or other suitable means 34, are a number of sections of harrow 35. For ordinary work I preferably use four sections, as shown in Fig. 3, but for cultivating corn and similar crops, I employ three sections, as indicated in Fig. 4. Ropes or chains 36 are fastened to each corner of the harrow sections and pass over pulleys 9 to cylinders 12 and have their ends secured to the latter by suitable means 37. By operating the lever 21, cylinders 12 can be rotated and the ropes 36 wound thereon and by this means the harrow sections can be raised from the ground for transportation from one place to another.

Secured to bar 32 are a pair of whiffletrees 38 by means of which two teams of horses may be hitched to the harrow for operating the same. When the harrows are in use the ropes 36 are unwound from cylinder 12 so as to provide sufficient slack to permit the harrow to follow the unequalities of the ground. The chains 34 are made of such length that they prevent the harrow sections from coming under the wheels in turning.

From the above description it will appear that I have invented a harrow that is provided with wheeled means by which it can be readily transported from place to place and upon which the operator can ride while harrowing the ground thus saving him the exertion due to walking behind the harrow for days at a time.

I am aware that minor changes can be made in the construction which I have shown and described and I desire this disclosure to be construed in an illustrative and not a limiting sense.

Having now described my invention or discovery, what I claim is:

A harrow comprising a plurality of sections, a frame of substantially rectangular shape, an axle extending longitudinally of said frame, wheels on the ends of said axle, a tubular roller on said axle corresponding to each harrow section, a toothed wheel on each of said tubular rollers, a handle pivotally connected to the rollers near said wheel whereby a movement of the handle will rotate the roller, a pawl secured to said frame and adapted to engage the toothed wheel to hold the roller from rotating, means comprising a spring for holding said pawl against said toothed wheel, a handle secured to said pawl and adapted to be engaged by the foot for moving the pawl out of engagement with said wheel, flexible means connected to the harrow sections and wrapped about the rollers whereby when said flexible means are wrapped about the roller, the sections will be raised, a tongue secured to the frame, a draft bar secured to the tongue, and means for connecting the harrow sections to the draft bar.

In testimony whereof I affix my signature.

GEORGE H. SHANE.